C. MURPHY.
SHAFT DETACHER.
APPLICATION FILED OCT. 16, 1908.
913,539.
Patented Feb. 23, 1909.
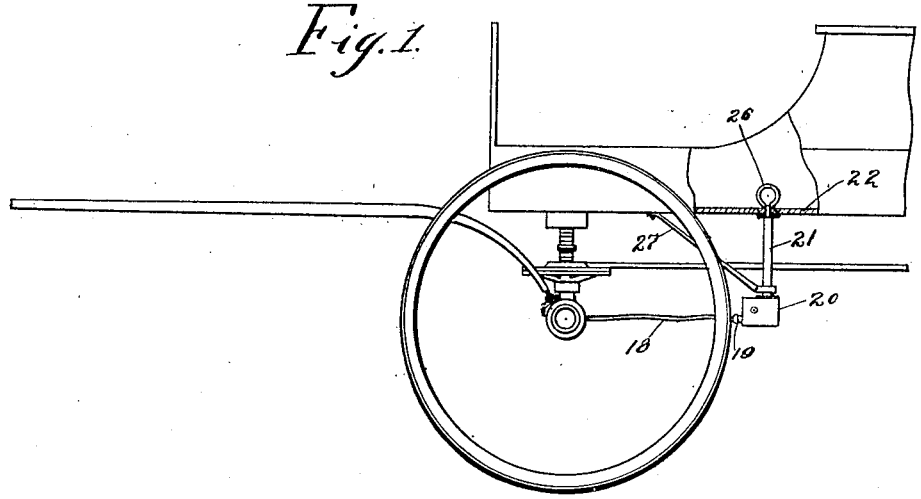
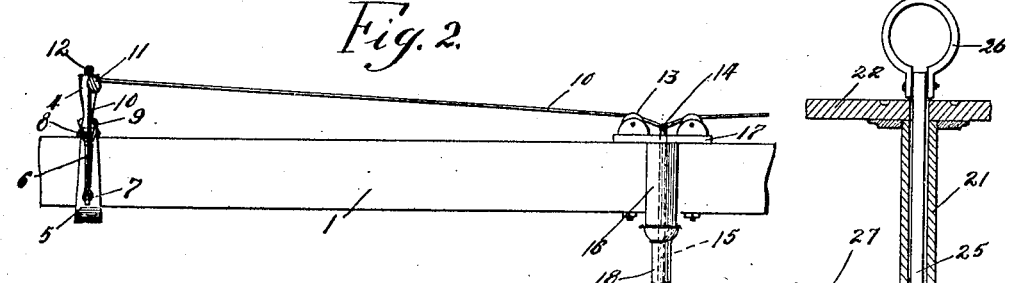
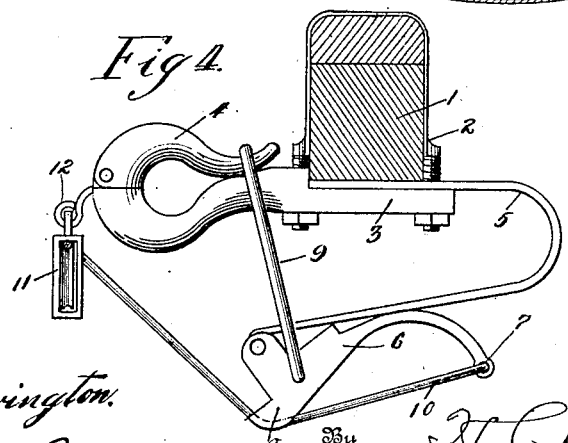
Witnesses
R. L. Farrington
K. H. Butler
Inventor
C. Murphy
By N. C. Everts Co.
Attorneys

UNITED STATES PATENT OFFICE.

COLEMAN MURPHY, OF CRAFTON, PENNSYLVANIA.

SHAFT-DETACHER.

No. 913,539.  Specification of Letters Patent.  Patented Feb. 23, 1909.

Application filed October 16, 1908. Serial No. 458,037.

*To all whom it may concern:*

Be it known that I, COLEMAN MURPHY, a citizen of the United States of America, residing at Crafton, in the county of Allegheny and State of Pennsylvania, have invented certain new and useful Improvements in Shaft-Detachers, of which the following is a specification, reference being had therein to the accompanying drawing.

This invention relates to a shaft detacher for vehicles, and the primary object of my invention is to release excited and run-away horses, whereby the vehicle or occupants of the same cannot be injured.

Another object of my invention is to provide a simple and inexpensive device for quickly detaching the shafts or tongue of a vehicle, the device being positive in its action and free from injury by ordinary use.

A further object of this invention is to provide a shaft detacher that can be operated from the driver's seat of a vehicle, the shaft detacher being applicable to various types of vehicles without detracting from the general appearance of the same.

With the above and other objects in view which will more readily appear as the invention is better understood, the same consists in the novel construction, combination and arrangement of parts to be presently described and then specifically claimed.

In the drawings:—Figure 1 is a side elevation of a portion of a vehicle equipped with my shaft detacher, Fig. 2 is a plan of the forward axle of the vehicle constructed in accordance with my invention, Fig. 3 is an enlarged sectional view of a portion of the shaft detacher, and Fig. 4 is an enlarged cross sectional view of the forward axle of the vehicle illustrating the shaft clip in elevation.

To put my invention into practice, I provide the ends of the forward axle 1 of the vehicle with straps 2 for holding clips 3 in engagement with said axle, each clip having a pivoted hook-shaped member 4 for engaging the eyebolt or coupling piece of a pair of shafts or tongue. Each clip is provided with a rearwardly extending resilient strap 5, which is bent forwardly under the axle and provided with a pivoted locking member 6, said member having one end thereof apertured as at 7 and the opposite end provided with a rounded guiding protuberance 8. Pivotally connected to the member 6 is a link 9 embracing the clip 3 and engaging the hook-shaped pivoted member 4. Attached to the apertured end of the member 6 is a cable 10 adapted to pass over the guiding protuberance 8 and through a sheave block 11 supported by an eyelet 12, carried by the forward end of the clip 3. The cables 10 extend through the central portion of the axle 1 and over sheave blocks 13, said cables being connected, as at 14, to a cable 15 that extends rearwardly through a sleeve 16, carried by a hanger 17 secured centrally of the axle 1. The cable 15 extends through a flexible tube 18 connecting the sleeve 16 with a nipple 19 forming part of a casing 20, said casing being secured to the lower end of a vertical sleeve 21 carried by the body 22 of the vehicle. Within the casing 20 is journaled a sheave 23 under which the cable 15 passes, said cable being connected, as at 24, to a rod 25 extending upwardly through the sleeve 21 and the body of the vehicle, where the upper end of said rod is provided with a pivoted link 26 adapted to lie upon the body of the vehicle when not in use, thereby preventing obstruction to persons stepping in and out of the vehicle. The vertical sleeve 21 has the lower end thereof connected by a brace 27 to the body 22 of the vehicle, whereby when the detacher is operated, it will be impossible for the sleeve 21 to break or sag due to an excess amount of pressure upon the sheave 23.

In operation, it is only necessary to pull upwardly upon the rod 25, at which time both of the locking members 6 will be swung forwardly swinging the pivoted connection of the link 9 past the center or pivot point of each locking member and allowing each link 9 to swing upwardly and free the pivoted hook-shaped members 4 of the axle clips. The resiliency of the strap 5 permits of each one of the locking members being easily and quickly swung forward, and impetus is imparted to the unlocking movement of the member 6 immediately upon the apertured ends of the links 9 passing the center or pivot point of each locking member. The flexible tube 18 permits of free and easy movement of the vehicle body relative to the axle 1, and it is apparent from the novel construction of the shaft detacher that vehicles can be easily equipped with the same.

While in the drawings forming a part of this application there is illustrated the preferred embodiments of my invention, it is obvious that the same can be varied or changed as to shape, proportion and manner of assemblage without departing from the spirit of the invention.

Having now described my invention what I claim as new, is:—

1. In a shaft detacher, the combination with an axle, of clips carried thereby, means connected to the clips for retaining a pair of shafts therein, locking members pivotally connected to said means and each provided at one end with a rounded protuberance and at its other end with an eye, cables connected to an eye of said locking members and passing over the protuberance of a locking member, sheave blocks carried by said clips for guiding said cables and extending at right angles with respect to the clips, sheave blocks connected to the axle approximately centrally thereof for guiding the cables and extending at right angles with respect to those sheave blocks carried by the clips, a sleeve suspended below the axle, said sleeve constituting a guide for said cables, a casing, a flexible tube connecting said sleeve with said casing, a vertically movable rod extending in said casing, a sheave located in the casing, and a flexible member connected to the lower end of said rod and to the ends of said cable.

2. In combination a pair of thill couplings, each having its locking lever provided with an eye and a protuberance, sheave blocks suspended from said thill couplings and positioned at right angles with respect thereto, a hanger depending from an axle, a pair of sheave blocks carried by the hanger, a sleeve suspended by the hanger, cables connected to the eyes of the locking levers and passing over the protuberances of said levers, over said sheaves and into said sleeve, a casing adapted to be suspended from a vehicle, a sheave block therein, a vertically movable rod extending in said casing, a tube connecting the sleeve with the casing, and a flexible member connected to the lower end of said vertically movable member, passing over the sheave in said casing and connected to the ends of said cables.

In testimony whereof I affix my signature in the presence of two witnesses.

COLEMAN MURPHY.

Witnesses:
MAX H. SROLOVITZ,
K. H. BUTLER.